United States Patent Office 2,767,820
Patented Oct. 23, 1956

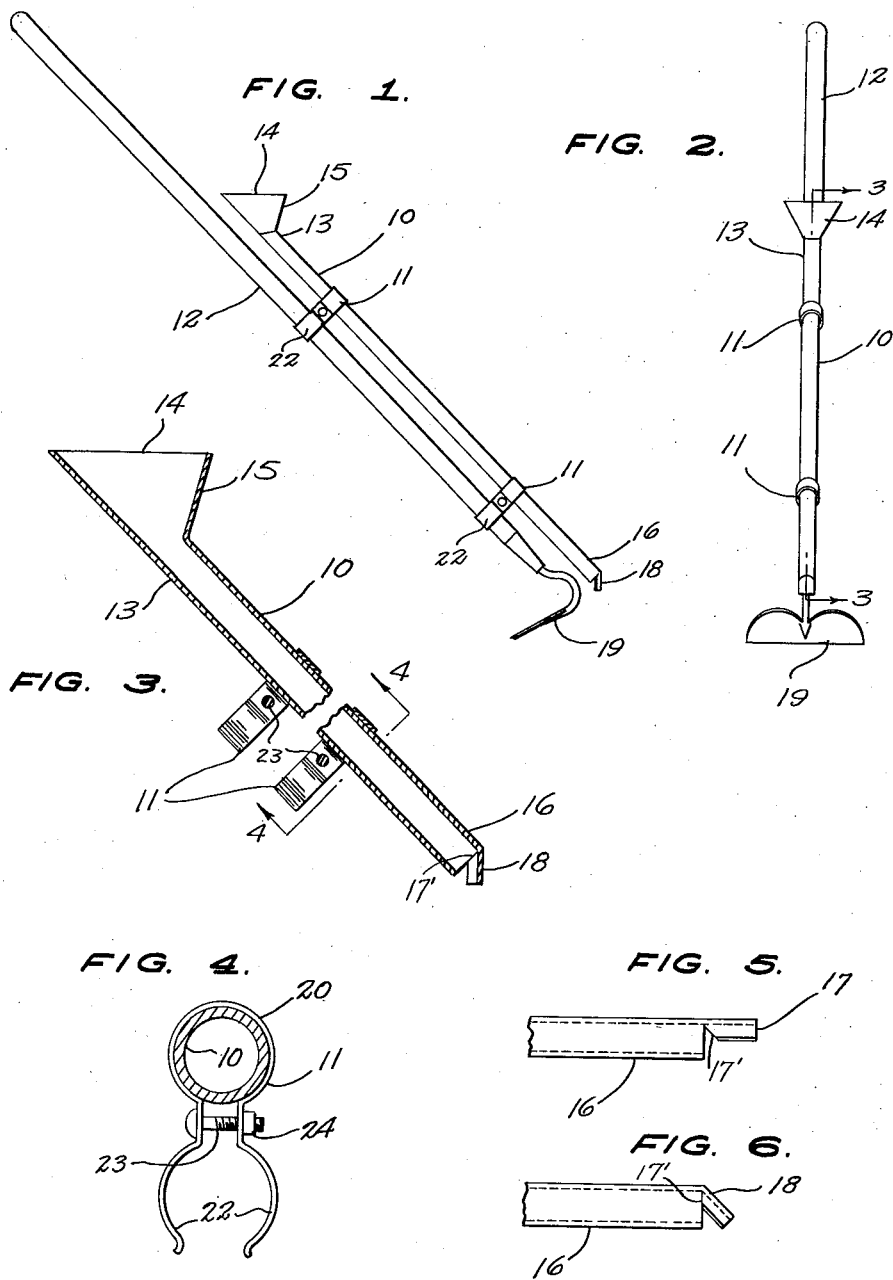

2,767,820

SEED PLANTING ATTACHMENT FOR A HOE

Vernon G. Ramsey, Lebanon, Oreg.

Application March 19, 1954, Serial No. 417,315

2 Claims. (Cl. 193—2)

The present invention relates generally to garden tools and specifically to a planting device for attachment to a hoe or other soil-working hand tool.

The principal object of the present invention is to provide an attachment for a hoe or other tool which receives a seed or several seeds at its upper end and delivers them to the ground at a point adjacent the blade of the hoe.

Another object of the present invention is to provide a light weight attachment for a hoe or rake which eliminates the necessity of bending over to place seeds in the ground.

A still further object of the present invention is to provide an attachment for a hoe which is readily attached and readily removed from the hoe and one which speeds the planting of seeds in holes or rows dug by the hoe.

These and other objects of the present invention will be apparent upon consideration of the following description when taken in connection with the appended claims and the annexed drawings, in which:

Figure 1 is a side view in elevation of the present invention shown attached to a hoe;

Figure 2 is a front view in elevation of the invention, as shown in Figure 1;

Figure 3 is a broken side view in section of the invention;

Figure 4 is a view in cross section taken on line 4—4 of Figure 3;

Figure 5 is a fragmentary view of the deflector end of the invention showing its most convenient mode of manufacturing; and Figure 6 is the deflector of the invention after forming, as in Figure 5.

Referring in more detail to the drawing, in which like numerals indicate like parts throughout the several views, the present invention consists of an elongated tubular body 10 having a plurality of clamp members 11 (here shown as two in number) by means of which the body 10 is secured to the handle of a hoe 12.

The upper end 13 of the body 10 is open and is formed into a conical mouth 14 having diverging sides 15 obliquely disposed relative to the longitudinal axis of the body 10 and when the hoe is extended to a work position as seen in Figure 1, the mouth opening is substantially horizontal and convenient to the user for dropping seeds through the body 10.

At the lower end 16 of the body 10, a flap 17 is formed as in Figure 5 from one side of the body 10 and, since it is defined by cutting away the opposite side of the body, is of arcuate cross section. Flap 17 is integrally connected in its midwidth area to the adjacent end 16 of body 10, and at opposite sides of said midwidth area, the inner end of flap 17 is cut away angularly to define inner end edges 17' on the flap that converge in the direction of the adjacent, squarely cut extremity of end 16 of the body 10. The end edges 17' are respectively oblique to the length of flap 17, being disposed at an acute angle to the longitudinal center line of the flap. The flap is bent as at 18 in Figures 1, 3 and 6, to form an angularly disposed seed deflector by means of which the seeds are diverted downwardly to the hole formed by the hoe blade 19 by the chopping stroke commonly used with this type of tool. When the flap is bent to its Figure 6 position, the end edges 17' move into abutting relation to the adjacent extremity of end 16 of body 10, while the length of the flap is extended obliquely to the length of body 10, the flap now being at an obtuse angle to said length of body 10. In Figure 4 is seen an end view of one of the clamping members 11, showing a strip 20 of metal overlying the body 10 at its center portion and being formed with circular ends 22 held together by bolt 23 and nut 24 to tightly encompass the hoe handle.

It is a purpose of this invention to provide a seed planting attachment for a hoe handle of light weight and simple construction and one which is inexpensive to construct and maintain.

In use, the present invention saves a great deal of the work of planting a garden, and all of the usual stooping to place the seeds properly. It has been found that most seeds gain sufficient momentum going down the tube body that when they strike the deflector they bounce a short ways toward the hoe blade. Thusly, it will be seen that a single short stroke of the hoe opens the ground a proper distance and after the seed is dropped, a short push on the hoe covers the seed and closes the hole.

The present invention contemplates the use of strip tin formed into a tube and seamed or soldered to its preferred shape, with a tab end formed into a deflector. It is further contemplated that the device can be attached to rakes or other elongated tools, or to the frame of a hand cultivator, and may be formed with more or less wider ends for the receiving and discharge of larger seeds, potatoes, peanuts, or even handfuls of soil nutrients in pill or powder form. Therefore, many changes and modifications may be made in the present invention without departing from the spirit and scope thereof as set forth in the following claims:

What is claimed is:

1. A seed planting attachment for a hoe comprising an elongated, straight, tubular body formed open at opposite ends thereof; a funnel shaped mouth integrally formed upon one end of the body; and a seed deflector at the opposite end of the body, said deflector being formed as a short, integral extension of said other end of the body, the body being of circular cross section at least at said other end thereof and the deflector being a part-cylindrical prolongation of said other end, the deflector having an integral connection to the extremity of said other end of the body at the midwidth area of the deflector, said deflector being formed at opposite sides of said midwidth area with end edges converging in the direction of said integral connection from opposite sides of the deflector, said end edges being at an acute angle to the length of the deflector and abutting against said extremity of said other end of the body, the deflector being disposed across said other end of the body at an obtuse angle to the length of the body.

2. A seed planting attachment for a hoe comprising a single length of material formed to include an elongated, straight, tubular body open at its opposite ends; a conical mouth on one end of the body having an upwardly opening inlet end lying in a plane oblique to the length of the body, said mouth through part of its circumference being extended for the full length of the mouth, as a prolongation of the corresponding part of the body circumference in longitudinal alignment with said part of the circumference of the body; and a downwardly opening seed deflector on the opposite end of the body, said deflector being formed as a short, integral extension of said other end of the body, the body being of circular cross section at least at said other end thereof and the deflector being a part-cylindrical prolongation of said other end of the body, the deflector having an integral connection to the extremity of said other end of the body at the midwidth area of the deflector, said connection of the deflector to the body being angularly spaced about the circumference of the body 180 degrees from said part of the body circumference, said deflector being formed at opposite sides of said midwidth area with end edges converging in the direction of said integral connection from opposite sides of the deflector, said end edges being at an acute angle to the length of the deflector and abutting against said extremity of said other end of the body, the deflector being disposed across said other end of the body at an obtuse angle to the length of the body.

References Cited in the file of this patent

UNITED STATES PATENTS

| | | |
|---|---|---|
| 117,191 | McSherry | July 18, 1871 |
| 365,108 | Trabue | June 21, 1887 |
| 586,457 | Rook | July 13, 1897 |
| 1,069,849 | Byrne | Aug. 12, 1913 |
| 1,478,894 | Estes | Dec. 25, 1923 |
| 1,895,180 | Tough | Jan. 24, 1933 |
| 2,032,258 | Caton | Feb. 25, 1936 |

FOREIGN PATENTS

| | | |
|---|---|---|
| 200,306 | Switzerland | Apr. 1, 1939 |
| 510,371 | Great Britain | Aug. 1, 1939 |